United States Patent
Ambler et al.

(10) Patent No.: US 10,175,508 B2
(45) Date of Patent: Jan. 8, 2019

(54) PHOTOCHROMIC OPTICAL LENS WITH SELECTIVE BLUE LIGHT ATTENUATION

(71) Applicant: Younger Mfg. Co., Torrance, CA (US)

(72) Inventors: David Mark Ambler, Rancho Palos Verdes, CA (US); Lingbing Lynn Zhao, Torrance, CA (US)

(73) Assignee: Younger Mfg. Co., Torrance, CA (US)

( * ) Notice: Subject to any disclaimer, the term of this patent is extended or adjusted under 35 U.S.C. 154(b) by 0 days.

(21) Appl. No.: 15/456,243

(22) Filed: Mar. 10, 2017

(65) Prior Publication Data

US 2017/0261768 A1    Sep. 14, 2017

Related U.S. Application Data

(60) Provisional application No. 62/308,088, filed on Mar. 14, 2016.

(51) Int. Cl.
*G02C 7/10* (2006.01)
*G02B 1/04* (2006.01)

(52) U.S. Cl.
CPC ............. *G02C 7/104* (2013.01); *G02B 1/041* (2013.01); *G02C 7/102* (2013.01); *G02C 2202/16* (2013.01)

(58) Field of Classification Search
CPC ........ G02C 7/107; G02C 7/104; G02C 7/102; G02C 2202/16; G02B 1/041
USPC .......................................... 351/159.6–159.65
See application file for complete search history.

(56) References Cited

U.S. PATENT DOCUMENTS

| | | | |
|---|---|---|---|
| 4,284,686 A | * | 8/1981 | Wedding .................. C03C 4/06 156/53 |
| 4,952,046 A | | 8/1990 | Stephens et al. |
| 5,235,358 A | | 8/1993 | Mutzhas et al. |
| 5,381,193 A | | 1/1995 | Wedding |
| 5,975,695 A | | 11/1999 | Baiocchi et al. |
| 6,102,543 A | | 8/2000 | Melzig |
| 6,863,844 B2 | | 3/2005 | Engardio et al. |
| 6,926,405 B2 | | 8/2005 | Ambler et al. |

(Continued)

FOREIGN PATENT DOCUMENTS

WO    2010105123    9/2010

OTHER PUBLICATIONS

Hellem et al. Webpage "Trivex Eyeglass Lenses: Tough and Lightweight" http://www.allaboutvision.com/lenses/trivex.htm, archived 2016.*

(Continued)

*Primary Examiner* — Zachary W Wilkes
*Assistant Examiner* — George G King
(74) *Attorney, Agent, or Firm* — SoCal IP Law Group LLP; Mark Andrew Goldstein; Angelo John Gaz

(57) ABSTRACT

The present invention is a photochromic eyewear lens product comprising photochromics material(s) and selective filtering agent(s) that selectively attenuate a portion of the blue light spectral region between 400 nm and 500 nm. The selective attenuation preferably comprises a maximum reduction in transmittance in the filtered region of about 10-25% T relative to at least one adjacent spectral region when the lens product is in the rest state, and a maximum reduction in transmittance that is measurably less than the transmittance of at least one adjacent region of the visible spectrum when the lens product has darkened in the activated state.

18 Claims, 2 Drawing Sheets

(56) References Cited

U.S. PATENT DOCUMENTS

| | | |
|---|---|---|
| 6,955,430 B2 | 10/2005 | Pratt |
| 7,255,435 B2 | 8/2007 | Pratt |
| 7,278,737 B2 | 10/2007 | Mainster et al. |
| 7,320,826 B2 | 1/2008 | Kumar et al. |
| 7,520,608 B2 | 4/2009 | Ishak et al. |
| 7,748,845 B2 | 7/2010 | Caspar et al. |
| 7,976,157 B2 | 7/2011 | Croft et al. |
| 8,403,478 B2 | 3/2013 | Ishak |
| 8,500,274 B2 | 8/2013 | Rishak |
| 8,684,524 B2 | 4/2014 | Archambeau et al. |
| 8,770,749 B2 | 7/2014 | McCabe et al. |
| 8,911,082 B2 | 12/2014 | Ambler |
| 2005/0196626 A1* | 9/2005 | Knox ............... C09K 9/02 428/447 |
| 2011/0075096 A1 | 3/2011 | Ishak et al. |
| 2015/0138661 A1 | 5/2015 | Blair et al. |
| 2015/0146166 A1 | 5/2015 | Weber et al. |
| 2015/0261010 A1 | 9/2015 | Kudla et al. |

OTHER PUBLICATIONS

George C. Brainard, et al., Action Spectrum for Melatonin Regulation in Humans: Evidence for a Novel Circadian Photoreceptor, J. Neuroscience, Aug. 15, 2001, pp. 6405-6412 vol. 21, No. 16, Society of Neuroscience, Washington, DC, USA.

* cited by examiner

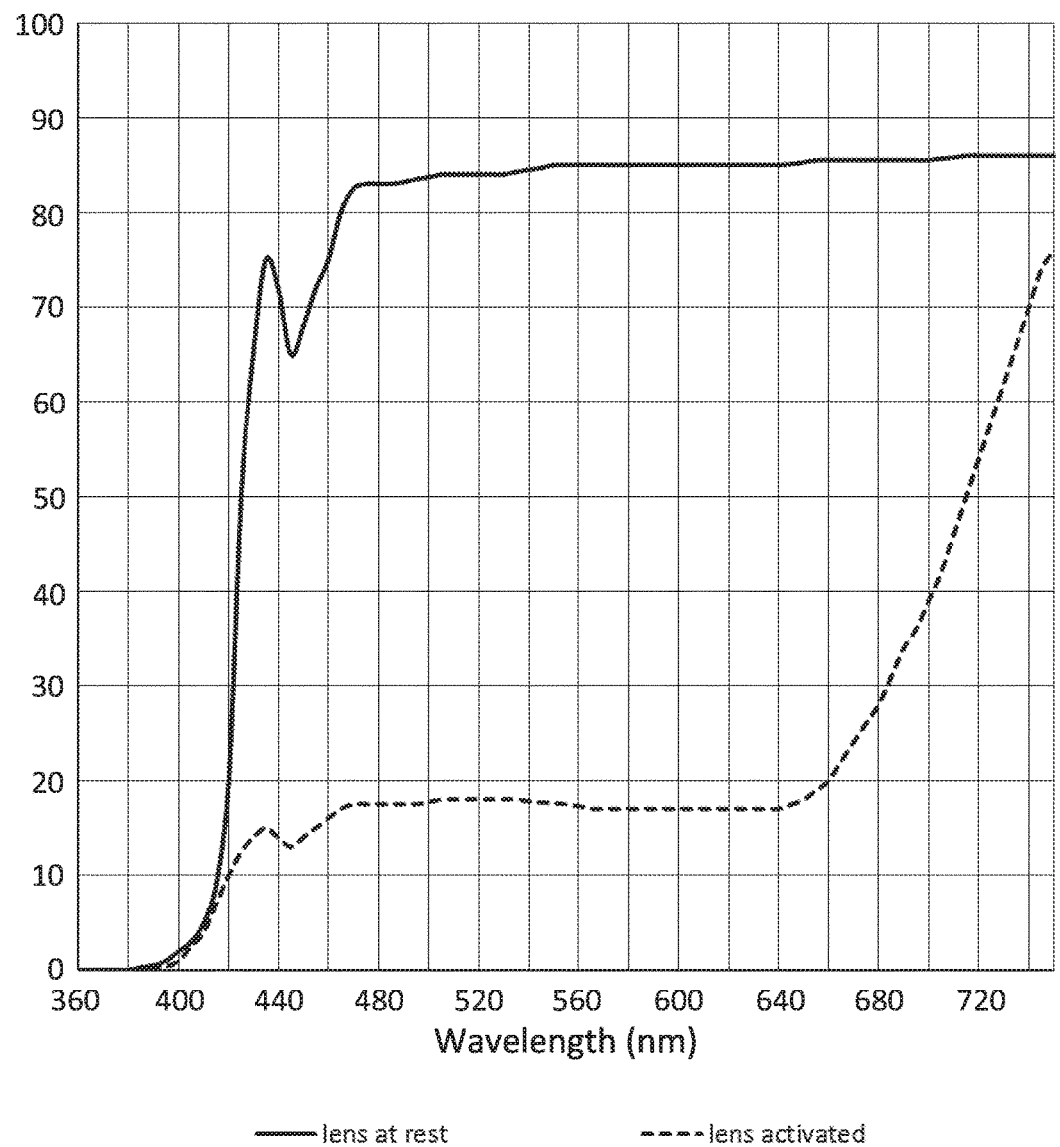

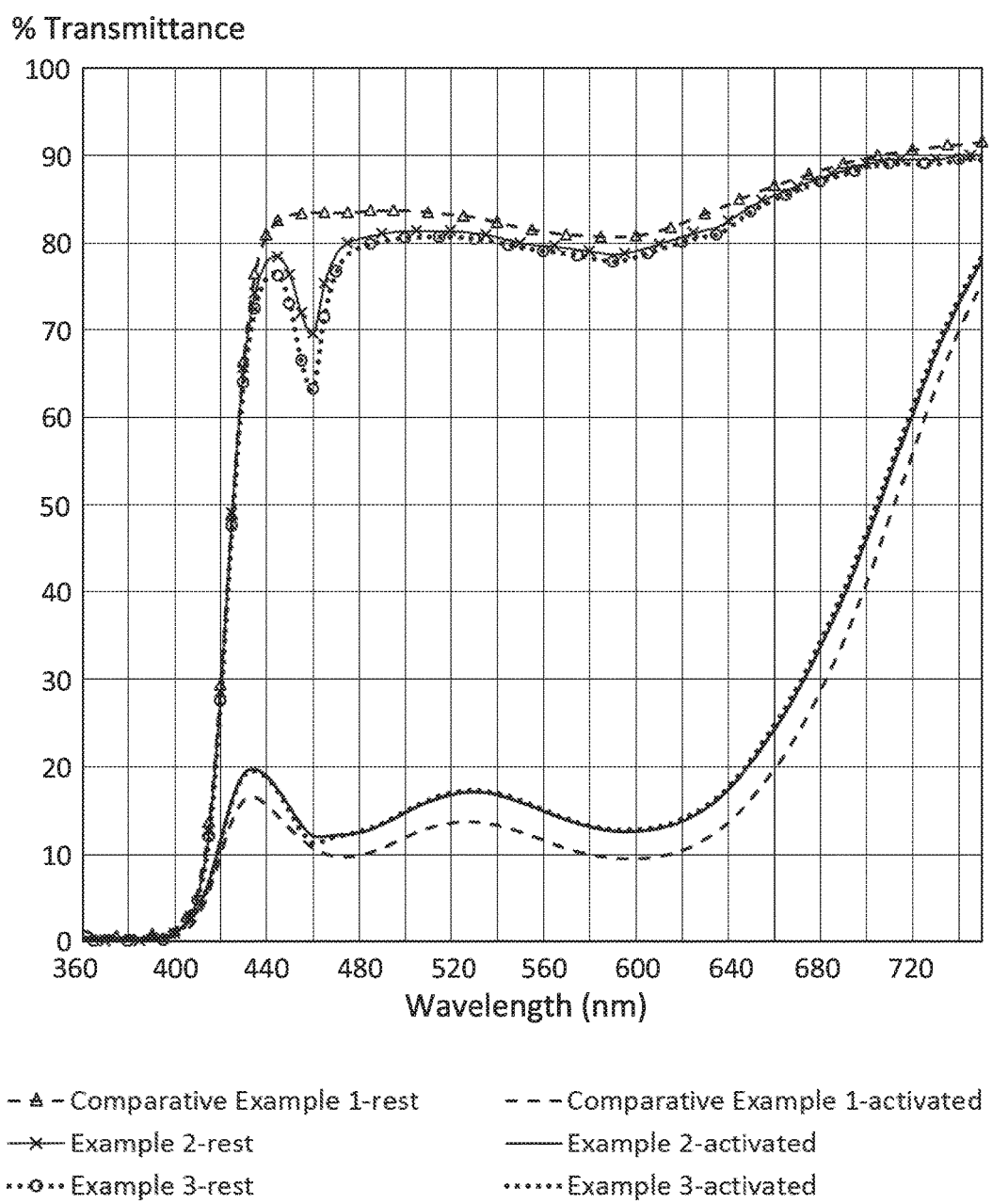

PHOTOCHROMIC OPTICAL LENS WITH SELECTIVE BLUE LIGHT ATTENUATION

CROSS-REFERENCE TO RELATED APPLICATION

This application claims the benefit of U.S. Provisional Application No. 62/308,088 filed on Mar. 14, 2016 and which is hereby incorporated herein by reference in its entirety.

FEDERALLY SPONSORED RESEARCH OR DEVELOPMENT

Not applicable.

JOINT RESEARCH AGREEMENT

Not applicable.

SEQUENCE LISTING

Not applicable.

PRIOR USE

Not applicable.

BACKGROUND OF THE INVENTION

Field of the Invention

The field of the invention relates generally to ophthalmic lens products and more specifically to lenses and lens blanks for eyewear, in which the lenses comprise one or more photochromic materials and may comprise other agents that combine to attenuate blue light.

Description of the Related Art

Ophthalmic lenses are commonly used to correct vision errors, aberrations and focusing deficiencies caused by age, disease or other factors. In addition to correcting physiological vision problems, ophthalmic lenses and eyewear may also be used to ameliorate physical or environmental conditions (such as glare, variable lighting, high intensity light, dust, condensation, etc.) that can affect sight. Eyewear may also incorporate aesthetic features for fashion and style.

Photochromic lenses are known in the industry and are one method to address varying lighting conditions. Lenses with photochromic agents typically respond to ultraviolet (UV) light exposure (such as sunlight) by darkening to reduce visible light transmittance. They may also change color upon exposure to light. While most commonly used photochromics are activated by UV, photochromics that respond and darken when exposed to short wavelength visible light have been described, for example, in U.S. Pat. Nos. 7,320,826 B2 and 6,102,543. U.S. Pat. No. 6,926,405 B2, incorporated herein by reference, further describes lenses that respond to varying light exposures, even behind UV-attenuating windows. This is preferably accomplished by photochromics that respond to (are activated by) either or both visible and UV light; the lenses may further comprise absorbers or reflectors of visible light, polarizers and other coloring agents.

Another more recent concern is the damaging, debilitating or disruptive physical effects that may be associated with exposure to various wavelengths of visible light. Multiple and varied studies have raised concerns about the human health effects of extended or repeated exposure to blue light. Various wavelengths and spectral ranges within the blue light region have been implicated in disrupting sleep patterns and circadian rhythms, may affect blood pressure and glucose homeostasis, may reduce melatonin production (which appears to have links to depression and some higher cancer rates), and may be a contributing factor toward retinal damage, macular degeneration, cataracts and other vision problems. To complicate matters, artificial light sources, particularly the more energy-efficient LED, fluorescent, and halogen sources, and the ubiquitous backlit displays, typically have much more intense and significantly narrower (more concentrated) spectral distributions in the blue light region in comparison to the broadband sunlight to which humans have adapted over the centuries. Nonetheless, few people are willing to give up their electronic devices or curtail their normal activities to limit such exposures. Therefore, many people desire practical and unobtrusive methods to protect themselves, or at least reduce the amount of blue light exposure.

Blue-blocking lenses have been available for decades and were often prescribed following cataract and other eye surgeries. Unfortunately, because many of these lenses functioned by strongly absorbing blue light, they have a distinct and cosmetically unappealing yellow or orange tint. The pronounced blocking of blue light (often greater than 90-99% below 500 nm) also can interfere significantly with color perception, jeopardizing traffic signal recognition as well as complicating many other color-based detection systems.

Various approaches have tried to address these concerns, often by a more limited reduction of blue light exposure. For example, U.S. Pat. Nos. 5,235,358; 7,255,435 B2; 7,278,737 B2; 7,748,845 B2; 8,500,274 B2 and U. S. Application 2011/0075096 A1 describe various ways to reduce some blue light transmission or block narrower spectral portions of the blue light range of wavelengths; U.S. Pat. Nos. 8,911,082 B2; 8,770,749 B2; 5,975,695 and U.S. Application 2015/0261010 A1 describe partial reductions in multiple wavelength bands in the blue light and other visible light regions.

These varied prior attempts illustrate that neither a single nor an obvious approach to filtering or limiting blue light exposure has been universally accepted. In fact, these patents indicate that notably different techniques, different filter locations and/or combinations of filtering approaches may be required to effect better performance and desired optical and spectral results.

Thus, it is of current and considerable interest to find innovative alternatives and more advantageous approaches to blue light filtering in ophthalmic lenses.

BRIEF SUMMARY OF THE INVENTION

The present invention is a photochromic eyewear lens product with selective attenuation in the region of the blue light visible spectrum. The eyewear lens product comprises one or more photochromic materials, and one or more selective filtering agents that create a region of selective attenuation in a portion of the visible blue light spectral region between 400 nm and 500 nm. In one preferred embodiment, when this photochromic eyewear lens product is in the rest state, its luminous transmittance is preferably in the range of 60-98% T and the region of selective attenuation has a maximum reduction in transmittance (relative to at least one adjacent region of the visible spectrum) that is in the range of about 5-50% T. Then, in this preferred embodiment, when the photochromic materials of this eyewear lens product are activated, its luminous transmittance drops into the range of 8-40% T and the region of selective attenuation has a maximum reduction in transmittance that is measurably less than the transmittance of at least one adjacent region of the visible spectrum.

In another preferred embodiment, when the eyewear lens product is in the activated state, the region of selective attenuation has a maximum reduction of less than 10% T relative to the transmittance of at least one adjacent region of the visible spectrum; in another preferred embodiment, when the eyewear lens product is in the activated state, the region of selective attenuation has a maximum reduction in the range of about 1-5% T relative to the transmittance of at least one adjacent region of the visible spectrum.

In a preferred embodiment, when the eyewear lens product is in the rest state, the region of selective attenuation has a maximum reduction in transmittance in the range of about 10-25% T relative to the transmittance of at least one adjacent region of the visible spectrum.

In another preferred embodiment, the region of selective attenuation is between about 420 nm and 470 nm. In another preferred embodiment, the region of selective attenuation is between about 440 nm and 480 nm. In a further preferred embodiment, the luminous transmittance of the eyewear lens product in the rest state is in the range of about 60-90% T. In another preferred embodiment, the luminous transmittance of the eyewear lens product is in the range of 12-25% T when the lens product's photochromic materials are activated.

In a preferred embodiment, the eyewear lens product comprises one or more lens materials selected from thermoplastic polycarbonate, hard resin thermoset polymers, polyurea-urethanes, polythiourethanes, episulfides, other sulfur-containing polymers with refractive indices higher than about 1.56, polystyrenes, polyamides, optical-grade nylon polymers, acrylics, polyacrylates and polymethacrylates.

In a more preferred embodiment, the eyewear lens product of claim 1, comprising a composite layered structure. At least one layer of the composite may comprise polyurea-urethane lens material.

In another embodiment, the one or more selective filtering agents comprise dyes, tints, pigments, inorganic interference filters, dichroic filters, multilayer thin film filters, multilayer polymeric interference filters, graded refractive index filter constructs, electrochromics, liquid crystals, electrically activated filters, magnetically activated filters or combinations thereof.

In another preferred embodiment, the one or more of the selective filtering agents are comprised in one or more components of the eyewear lens selected from coatings, layers, films, inserts, laminates and sheets. At least one of the components may comprise polyurea-urethane lens material.

In a preferred embodiment, the eyewear lens product further blocks an average of at least 98% of light within the 315 nm-400 nm region. In another preferred embodiment, the eyewear lens product comprises additives such as photochromics, electrochromics, thermochromics, nanoparticles, liquid crystals, dyes, tints, pigments, UV absorbers, UV reflectors, UV stabilizers, thermal stabilizers, IR reflectors, visible light filters, selective light reflectors, and selective light absorbers. In another preferred embodiment, the eyewear lens product comprises applied coatings such as hard coatings, hydrophobic coatings, anti-fog coatings, moisture-barrier coatings, mirror coatings, visible light anti-reflective coatings, UV anti-reflective coatings, photochromic coatings, electrochromic coatings, polarizing coatings, polarizing multilayer thin film coatings, multilayer interference coatings, conductive coatings, visible light-filtering coatings, UV light-filtering coatings and infrared light-filtering coatings.

BRIEF DESCRIPTION OF THE DRAWINGS

FIG. 1 shows an exemplary UV-visible spectral plot of a lens design according to the invention, in the rest state and with the photochromic materials activated.

FIG. 2 shows UV-visible spectral plots of two exemplary embodiments of lens products according to the invention (solid and dotted lines) in comparison to a commercially available photochromic lens (dashed lines). The transmittance of each lens product is plotted in both the rest state and with its photochromic materials activated.

DETAILED DESCRIPTION OF THE INVENTION

The invention is an ophthalmic lens product comprised of at least one photochromic material and at least one additional selective filtering agent, such that the resultant lens attenuates at least a portion of the blue light visible spectrum under all lighting conditions more strongly than one or more adjacent wavelength ranges. The lens product's selective filtering may be more pronounced relative to the overall transmittance spectrum when the photochromic materials of the lens are less activated than when the lens is fully activated to a darker state. This ophthalmic lens product may be created by combining the additional selective filtering agent with an existing photochromic lens, combining both the photochromic material and the selective filtering agent with an existing lens, or by designing and manufacturing a photochromic lens to include the extra selective filtering agent(s). The inventive lens may attenuate one or more portions of the blue light spectrum, and may attenuate different portions of that spectral region depending on the whether the photochromic material is activated, or the extent to which it is activated.

Ophthalmic lenses and lens blanks are optical products intended for use with the human eye, and may include products for spectacle or other eyewear frames, contact lenses and intraocular lenses. The preferred embodiments of this invention are ophthalmic lenses and lens blanks (including both semi-finished and finished configurations) intended for eyewear frames, designated for convenience of description as "eyewear lens products." Ophthalmic-quality eyewear lens products are lenses and lens blanks with sufficient structural integrity that they maintain the necessary prescribed optical power of the finished eyewear lens, whether that prescribed power is zero (plano), plus, minus or multifocal. Ophthalmic-quality eyewear lenses also include non-prescription lens products (including plano sunglass lenses and lens blanks) made to optical power tolerances as defined in recognized national and international standards such as ANSI Z80.3; ISO 12311 and 12312; or AS/NZS 1067. Eyewear lens blanks are products that are made of materials and designs suitable for ophthalmic eyewear lenses, but are not in final form for a wearer's use. Such lens blanks need to be further shaped or modified to produce a prescription or non-prescription optical power, or to fit within an eyewear frame. For example, many eyewear lens blanks have one surface that is curved suitably for mounting in eyewear frames and supplying some ophthalmic attributes, but the other, opposite surface needs to be ground and polished to complete the full prescription power required by the individual wearer. Such eyewear lens blanks are known in the art as "semi-finished" lens blanks. In contrast, "finished" lenses and lens blanks are recognized in the art as lenses that have the final corrective power and suitable lens thicknesses for eyeglass frames, but may need to be edged to the correct frame shape for mounting. Often eyewear lenses or lens blanks are provided in larger diameters than many eyewear frames, such that they may be custom-edged down to the final shape and size needed to fit a wearer's chosen frame.

Eyewear frames for use with eyewear lens products include spectacle frames, rims, mountings, goggles, helmets, carriers, visors or other structures designed to hold lenses in front of the user's eyes.

Many different optical materials may be used to form eyewear lens products. Such materials exhibit low intrinsic haze or scatter, and must have sufficient chemical, physical and mechanical integrity to endure long term wear and maintain the prescribed optical power. Among the materials known in the art are both inorganic and organic optical materials, such as metal oxide glasses with various refractive indices; optical-grade thermoplastic polycarbonate; hard resin thermoset polymers [based on polyol(allyl carbonate) polymerization, and particularly on reactions of diethylene glycol bis(allyl carbonate)], polyurea-urethanes such as those described in U.S. Pat. Nos. 6,127,505, 7,002,744 B2 and 6,531,076 B2; polyurethanes; polythiourethanes; episulfides; other sulfur-containing polymers with refractive indices higher than about 1.56; polystyrenes; polyamides; certain enhanced optical-grade nylon polymers; acrylics; polyacrylates; polymethacrylates and other organic polymers. The optical materials may also comprise mixed organic and/or inorganic materials of crystalline, amorphous or polymeric structures, and may contain other additives to modify the materials' optical, physical or chemical properties. Eyewear lens products may also comprise combinations of optical materials as layered structures and composites.

While optical quality is a requirement for eyewear lens products, these products will not transmit 100% of all visible light. This is due to the physical laws of refractive index differences and resultant reflection at surfaces, and to inherent or designed absorptance or reflectance of the lens materials or the lens construction. In fact, it may be highly desirable to have the eyewear lens products limit transmittance of some visible light, as well as some light in other wavelength regions. For example, in many preferred embodiments, the eyewear lens products will attenuate or block a significant amount of UV light in the 315 nm to 380 nm wavelength region. This can be accomplished by intrinsic absorption properties of the lens material, or result from additives or treatments combined with the lens or lens material(s). As one example, UV absorbers may be added to or added with one or more reactants that form the polymer matrix of the eyewear lens product. In another example, other added components of the lens product may include one or more UV reflectors or absorbers. Such other components include coatings, films, inserts, laminates, layers, and sheets that provide beneficial properties to the lens product.

In preferred embodiments, the lens material(s) or other components of the eyewear lens product may further comprise one or more additives. The additives may include substances that modify the polymeric structure of a lens material or component, or alter its physical, optical or chemical properties for better performance as an ophthalmic lens. Additives may also be included to increase the stability of a particular material's properties, or to tailor them to a specific optical or physical performance. Preferred additives include substances such as photochromics, electrochromics, thermochromics, nanoparticles, liquid crystals, dyes, tints, pigments, UV absorbers, UV reflectors, UV stabilizers, thermal stabilizers, IR reflectors, visible light filters, selective light reflectors, and selective light absorbers and the like.

Optionally, the eyewear lens product may further comprise additional components that enhance appearance, or modify the performance or functionality of the product for particular eyewear lens use. In one preferred embodiment, the lens product may comprise a polarizer component, which may be embodied as a film, wafer, supported film, coating, multilayer thin film coatings, multilayer polymeric film stack, wire grid, or an applied or embedded structure. Preferred polarizers are selected from linear, gradient linear, elliptical, circular or variable polarizers, and may comprise solid, mixed, multiple or gradient tints. In another preferred embodiment, the eyewear lens product may comprise optional components with features such as displays, cameras, sensors, transmitters, receivers, electrical contacts, wireless devices, marks and decorations.

The eyewear lens product may also comprise optional applied coatings such as hard coatings, hydrophobic coatings, anti-fog coatings, moisture-barrier coatings, mirror coatings, visible light anti-reflective coatings, UV anti-reflective coatings, photochromic coatings, electrochromic coatings, polarizing coatings, polarizing multi layer thin film coatings, multilayer interference coatings, conductive coatings, other visible, UV or infrared light-filtering coatings and other coatings to tailor the optical, chemical or mechanical properties of the lens. Coatings may comprise one or more layers; for instance, multilayer interference coatings of dielectric, metal/dielectric or conductive/insulating materials can range from two to several hundreds of layers. In addition, one or more types of coatings may be used in combination with the eyewear lens product.

In addition, optional treatments may be used to change the surface properties of the lens, and include such options as moisture barriers, anti-fogging and ease of cleaning treatments.

The optional coatings or other components may be positioned on one or more surfaces of the eyewear lens product, or may be embedded, layered, encased, joined, bonded or otherwise associated with the lens. One or more coatings or components may further comprise additives. One or more coatings or components may be used alone or in combination(s) with a given lens product.

In a preferred embodiment, the eyewear lens product will block an average value of at least 98% of the light within the near UV (280 nm-380 nm) region; in a more preferred embodiment, the eyewear lens product will block an average value of at least 99% of the light within the 280 nm-380 nm region. These embodiments provide significantly reduced exposure to potentially damaging UV light in both the UV A and UV B regions. In another preferred embodiment, the eyewear lens product will block an average value of at least 98% of the light within the 315 nm-400 nm region; in a more preferred embodiment, the eyewear lens product will block an average value of at least 99% of the light within the 315 nm-400 nm region. This provides significantly reduced exposure both to UV light and to high energy blue light at the edge of the blue light spectrum.

The eyewear lens product comprises at least one photochromic material. Preferred photochromic materials include inorganic materials such as silver halides and dichroic metal oxides, as well as organic materials including some dichroic organic dyes, thermochromics (particularly metallo-organic thermochromics), and many different aromatic, hetero-aromatic and ring compounds such as spiro (indoline)pyrans, naphthopyrans, benzopyrans, dithizonates, benzoxazines, spiro-oxazines, spiro(indoline)naphthoxazines, spiro-pyridobenzoxazines, anthroquinones, oxazines, indolizines, fulgides, fulgimides and other photochromic materials known in the art. Various methods to create photochromic lens products, such as those described in U.S. Pat. No. 7,320,826 B2 and others known in the art may be used to impart or associate photochromic material s with the eyewear lens product.

In one embodiment, one or more photochromic materials are combined to create an eyewear lens product with a neutral gray color when the photochromics are activated. In another preferred embodiment, the lens comprises one or more photochromic materials that provide an identifiable color other than grey when activated. In another preferred embodiment, the eyewear lens product comprises one or more photochromic materials that provide a light tint to the eyewear in the rest (unactivated) state, but a darker tint when activated by visible and/or UV light.

In another preferred embodiment, the eyewear lens product changes its color hue under different lighting intensities or wavelength exposures.

In a preferred embodiment, the lens may be advantageously designed to make use of the one or more photochromics that are activated by different wavelength regions (such as UV exposure, near UV exposure, near-visible light exposure or blue light exposure) to change either or both color hue and depth of tint. Most commercially available photochromic materials are only activated by UV light, but a few photochromic materials either absorb and react under visible light, or have an absorption tail that extends into the visible range (near the blue light edge) so that they have some limited response to visible light. The inventors found that these photochromic materials with visible light activation may be used effectively for additional UV and blue light filtering in the invention, in addition to and/or augmenting the selective filtering agent. Such visible light activated photochromic materials may be used either alone or in combination with other UV-activated photochromic material (s). By use or combination of photochromic materials that are activated by different light frequencies, the inventors can advantageously tailor the eyewear lens to respond to illumination outdoors, from various artificial light sources, or to light filtered through windows or windscreens.

The eyewear lens products of the invention further comprise at least one additional selective filtering agent. The combination of both photochromic material(s) and additional selective filtering agent(s) is specifically designed to enable the lens of the invention to selectively attenuate at least a portion of the blue light spectrum, and preferably, attenuate more strongly when the photochromic material(s) are less activated than when their darkening contribution is already filtering much of the visible spectrum. This combination of responsiveness and selective attenuation uniquely characterize the benefits of this eyewear lens product.

In a preferred embodiment, the eyewear lens will selectively attenuate light in one or more regions within the blue light spectral range from 400 nm to 500 nm, and additionally, will respond to changes in UV and/or visible light exposure. The selective filtering of the eyewear lens is preferably designed to address one or more of the following needs, whether or not the photochromic materials) are activated: 1) avoid unacceptable aesthetic color of the lens; 2) maintain good visual perception of the natural color of objects viewed through the lens; 3) block a significant portion of UV light in the wavelength range 315 nm-380 nm; 4) attenuate at least one selected portion of the blue light wavelength region more strongly than one or more adjacent spectral regions under all lighting conditions, and 5) in terms of absolute difference in transmittance in the selectively attenuated region vs. one or more adjacent regions, attenuate the at least one selected portion of the blue light wavelength region more strongly when the lens product has high visible light transmittance than when it has darkened to lower transmittance.

The selective attenuation of the eyewear lens product of the invention is designed to comprise a controlled and limited amount of filtering rather than a total blocking of a wavelength region; that is why it is described as "attenuation." If 100% of light in a given visible region is blocked, it may disadvantageously hinder or interfere with color perception. In addition, studies have suggested that even partial attenuation of blue light exposure can have beneficial effects for human health factors. Therefore, the eyewear lens product is designed to only attenuate a portion of the blue light spectral range, and only attenuate the selected region within the 400-500 nm range by less than 100%.

Filtering significantly less than 100% of the light in a given region can be effective in creating a noticeable and helpful reduction in blue light exposure, and yet maintain overall luminous transmittance (i.e., the integrated average transmittance over the entire visible spectral region, weighted for the eye's response to a designated, standard light source) near a desired value for the eyewear lens product.

The photochromic eyewear lens of the invention has a high luminous transmittance in the rest state (when the photochromic material(s) of the lens are essentially unactivated), and a significantly lower luminous transmittance when the photochromic materials are activated (such as upon exposure of the lens to sunlight). In a preferred embodiment, the luminous transmittance of the lens in the rest state is in the range of 60-98%; more preferably, in the range of 75-98%; and in another preferred embodiment, the rest luminous transmittance is in the range of 80-98%. In a preferred embodiment, the minimum luminous transmittance in the rest state is at least 75%, to meet minimum transmittance requirements for night driving as established by ISO 8980-3:2013 *Ophthalmic optics—uncut finished spectacle lenses—Part* 3*: Transmittance specifications and test methods*. In another preferred embodiment, minimum luminous transmittance in the rest state is greater than 80%, to meet minimum transmittance requirements for night driving as established by Australian/New Zealand Standard™ AS/NZS 1067:2003 *Sunglasses and fashion spectacles*.

When the photochromic material(s) of the lens products according to the invention are activated, the preferred range for the significantly lower luminous transmittance exhibited by the lens product is 8-40%; and more preferably in the range of 10-25%. In another preferred embodiment, the luminous transmittance of the lens product when the photochromic material(s) are activated is in the range of the 12-25%. These ranges are consistent with various national and international standards' minimum luminous transmittance values established for daytime driving.

The degree of selective attenuation in the blue light region that is effective depends on the overall transmittance of the lens product, and more specifically, on the transmittance values of regions adjacent to the region that is selectively attenuated.

When the lens product is in the rest state or has very limited activation such that one or more visible spectral regions adjacent to the region of selective attenuation have high background transmittance (e.g., 60-90+% T), a relatively larger reduction of transmittance in the selectively attenuated region is preferred than in the activated state, when the overall transmittance of the lens has been decreased. When one or more of the adjacent regions have transmittance values in the range of about 60% T to greater than or equal to 90% T, the maximum reduction in transmittance observed within the selectively attenuated region is in the range of less than 10% T to about 50% T. In a preferred embodiment, the maximum reduction in transmittance observed within the selectively attenuated region (vs. transmittance in one or more adjacent regions of 60% T or greater) is in the range of about 10% T to about 25% T.

Similarly, when the photochromic material(s) of the lens product have been activated and the luminous transmittance of the lens has dropped into the range of about 8% to less than about 40%, a maximum reduction in transmittance within the filtered region (vs. one or more adjacent regions) of less than 1% to about 10% T may show a demonstrable and effective benefit. In a preferred embodiment, when one or more adjacent regions have transmittance values in the range of 10% to 25%, the maximum reduction in transmittance observed within the selectively attenuated region is in the range of about 1-5% T.

FIG. 1 shows the transmittance behavior for a design of an exemplary eyewear lens product that illustrates the selective attenuation and the behavior of the invention more clearly. A plano powered single vision eyewear lens product comprises photochromic material(s) and selective filtering agent(s) such that the total luminous transmittance (D65 light source reference) of the lens in the rest state is 84%. This is shown in FIG. 1 as the solid line. This exemplary lens shows at least 99% blocking of UV light in the region below 380 nm. In the rest state, when the photochromic material(s) are unactivated, the transmittance decreases slightly from 85% near 550 nm to about 82% near 470 nm. For this exemplary illustration, the selective filtering agents create a region of lower transmittance between about 435 nm and 470 nm, by blocking some of this blue light. In this region of controlled attenuation, the maximum reduction in transmittance for the rest state is about 10-18%, resulting in a minimum transmittance at about 445 nm of 65%. As shown, a range is given for the value of maximum reduction in transmittance, due to the fact that the transmittance in the adjacent region of the visible spectrum from 400-435 nm has a different and lower value (75% maximum T at 435 nm) than the transmittance in the adjacent spectral region above 470 nm (82-85% T).

In the activated state, the total visible transmittance of the lens decreases throughout the entire visible spectrum, due to darkening of the lens by action of the photochromic material(s). The dashed line of FIG. 1 shows an example of this responsive lens behavior. The luminous transmittance (D65 light source reference) in the activated state is 17.5%. The selective filtering of the lens in the region from about 435 nm to 470 nm is still discernible, but due to the lower overall transmittance, is not as noticeable a feature or as large a reduction in transmittance (relative to adjacent spectral regions) as in the rest state. In this exemplary eyewear lens product, the maximum reduction in transmittance in the filtered region is about 2-4% vs. the adjacent spectral regions, corresponding to a minimum transmittance at about 445 nm of 13%.

This illustrates one example of the responsiveness and selective attenuation of an eyewear lens product according to the invention. The lens' filtered region is designed to be limited in wavelength range, and limited in both maximum transmittance reduction and in the relative transmittance reduction vs. one or more adjacent wavelength regions. Thus, an effective attenuation in specific portions of the blue light region can be achieved, while preferably maintaining overall visible light transmittance at higher levels for general good viewing performance through the lens.

In the rest state of the lens, such controlled and limited attenuation may comprise a maximum reduction in transmittance (relative to adjacent spectral regions) in the selected filtered wavelength range of less than 50% T. In a more preferred embodiment, the maximum reduction in transmittance is less than about 25% T; in another preferred embodiment, the maximum reduction in transmittance is between about 25% T and 10% T; in another preferred embodiment, the maximum reduction in transmittance is less than about 10% T.

In another preferred embodiment, the maximum reduction in transmittance for the attenuated region when the lens is in its rest state is less than about 10% T relative to at least one adjacent region of the visible spectrum. In another preferred embodiment, when the lens is in the rest state, the maximum reduction in transmittance is less than about 5% in the selected region relative to at least one adjacent region of the visible spectrum. In another preferred embodiment, when the lens is in its rest state, the maximum reduction in transmittance for the attenuated region is in the range of 5-50% T relative to at least one adjacent region of the visible spectrum.

In a preferred embodiment, when the photochromic material(s) of the lens are activated, the maximum reduction in transmittance in the selectively attenuated region is less than about 10% relative to at least one adjacent region of the visible spectrum; in another preferred embodiment, the maximum reduction in transmittance in the selected filtering region for the lens when activated is less than about 5%. In another preferred embodiment, the maximum reduction in transmittance in the selected filtering region for the lens when activated is in the range of about 1-5% T relative to at least one adjacent region of the visible spectrum; in a more preferred embodiment, the maximum reduction in transmittance in the selected filtering region for the lens when activated is less than 4% but greater than 1% relative to at least one adjacent region of the visible spectrum. In another preferred embodiment, the maximum reduction in transmittance in the selected filtering region for the lens when activated is measurably less than the transmittance relative to at least one adjacent region of the visible spectrum.

The photochromic material(s) of the eyewear lens product will cause a reduction in lens transmittance when they are activated by their characteristic absorbance of UV and/or visible light. This change alone may cause a reduction of transmittance in the blue light region of the visible spectrum. However, the lens of the invention is designed to ensure that the selective filtering agent also contributes to a reduction in blue light transmittance, whether or not the photochromic material(s) are activated. This serves the invention's purpose of providing enhanced blocking of blue light exposure under all lighting conditions. In a further advantage of the lens product, the maximum reduction in transmittance in the blue light region of selective filtering is greater in the lens' rest state than in its activated state. As an example, the maximum reduction in the region of selective attenuation may be 15% when the lens product is in the rest state (i.e., the photochromic material(s) are not activated and the lens product has high overall visible transmittance), but only show a 3% reduction in transmittance when the lens is darkened by the activated photochromic material(s). This difference in the observed reduced transmittance in the selectively attenuated wavelength region is due to the fact that transmittance is not a linear function. In addition, the invention enables a possible (and preferred) combined effect of both the lens product's selective filtering agent(s) and the activated darkening of its photochromic material(s) reducing overall transmittance in the selected region of the blue light spectral range.

One preferred region of selective attenuation is near 440 nm. Light near about 430-440 nm has been implicated as a possible factor in retinal damage and macular degeneration. Another preferred region of selective attenuation is near about 450 nm. Light near about 445-480 nm has been shown to adversely affect circadian rhythms, as reported by George C. Brainard, et al., *J. Neuroscience* (2001) 21: 6405-6412. For example, a preferred attenuating filter might show lower transmission in the range from about 410 nm to 450 nm relative to the lens' transmittance at higher wavelengths. (Due to desired UV blocking, transmittance below 410 nm may already be significantly reduced for the eyewear lens product.) In other preferred embodiments, the selective attenuation of the eyewear lens product may show lower transmittance in the region of 440-500 nm, the region of 460-500 nm, the region of 440-480 nm, the region of 440-460 nm, the region of 450-480 nm, or the region of 460-480 nm.

The selective blue light attenuation may be accomplished by several different methods. For example, dyes, tints or pigments that absorbs or reflects in at least a portion of the blue wavelength region may be included in, on or with the eyewear lens. Some examples of suitable tints and dyes are available from commercial businesses such as Exciton, Inc. (Dayton, Ohio); Brain Power Inc. (aka BPI; Miami, Fla.); and Phantom Research Laboratories, Inc. (El Cajon, Calif.), among others.

Inorganic interference filters, dichroic filters, multilayer thin film filters, multilayer polymeric interference filters and graded refractive index filter constructs may also comprises the selective attenuating filter of the eyewear lens product. Due to the invention's design, such filters may often be quite simple and may not require as many layers to achieve the desired selective filtering effect as common narrow bandpass rejection filters; since only a partial attenuation of a portion of the blue light spectral region is required for the invention, far fewer layers are needed. This means the construction of these attenuating filters is less delicate in structure, less complex, less demanding in precision, less time-consuming to make, and potentially less expensive.

Coatings, films, sheets, laminates, inserts and other components with blue-light attenuating filters are other preferred embodiments.

These passive selective filtering agent(s) are one form of preferred embodiments, but the eyewear lens product may also comprise active selective filtering agent(s) such as electrochromics, liquid crystals, or other active filtering agent(s) that require an energy source (e.g., electrical, magnetic, etc.) to change optical density or hue. For active agent(s), the energy source or attachments for the source may be either remote or incorporate in or with the lens product.

Any of these techniques may be used alone or in combination to create the blue light attenuating filter. For instance, a multilayer polymeric interference filter may be incorporated into a laminate or insert, or a multilayer thin film filter may comprise a coating on the lens product.

Various methods may also be used to associate one or more of these blue light attenuating filters with the eyewear lens product. For example, dyes, tints and pigments may be added to the monomers or reactants that form the optical-grade lens material, imbibed into the lens product, applied via a tint bath, included in a coating or additional layer on or in the lens product, or embedded as a film, sheet, laminate or other component within the structure of the lens product. The different filters, layers, coatings, films, sheets, laminates, inserts and other components may be applied to one or more surfaces of the lens product, embedded within the lens, adhesively bonded, integrally bonded or otherwise included in or on the lens. Combinations of methods may be particularly useful to associate two or more filters or different types of filters with the lens product. This may be preferable when multiple filters attenuate multiple light regions, or when a dispersed structure offers mechanical, optical or chemical advantages. For example, if a dye has excellent absorbance to attenuate a desired blue light spectral region, but it is only sparingly soluble in the polymeric matrix of the lens product, it may be more efficient to create a dispersed structure, in which the dye is dissolved into multiple discrete layers of the polymer, and the layers are stacked or joined together in the eyewear lens product to achieve the degree of selective filtering desired.

The eyewear lens product may be clear (i.e., when the lens is viewed against a white background, a distinct tint or hue is not discerned by the unaided eye) in the rest state, when the photochromic material(s) of the lens are not activated. In another preferred embodiment, the eyewear lens product may have a light tint when the one or more photochromics are not activated, but may progress to a darker tint or a different hue as one or more of the lens' photochromics are activated. Such tinting may be caused by residual color of the photochromic material(s) alone, the combination of the photochromic material(s) with the additional selective filtering agent(s), and/or other optional additives or lens components. The absence or presence of this "rest state" tint or hue may be selected in accordance with the invention to suit cosmetic or aesthetic needs, to meet specific attenuating filtering demands, or to provide a visual signature of the invention's lens design.

Advantageously, the combination of the photochromic material(s) and the selective filtering agent(s) of the invention may synergistically enhance the selective filtering of the eyewear lens product. For example, the photochromic material(s) with absorption bands in the UV or near visible region may provide additional beneficial blocking of UV and/or high energy (short wavelength) blue light even in the rest state. This may be enhanced or combined with UV blocking properties associated, for example, with the lens material(s), optional additives, or the selective filtering agent(s). For example, these features may cooperate with the lens material (or additives in the lens material) to provide greater than 99% blocking of light with wavelengths shorter than 400 nm. In the rest state of the lens product, when the photochromics have not been activated, the lens will exhibit a higher visible transmittance value than when the photochromic material(s) are activated. However, even in the rest state of this eyewear lens product, the selective filtering agent will provide a region of controlled but demonstrably lower transmittance in a specific blue light region (as one preferred example, in the range of 440-480 nm) than in one or more adjacent spectral regions. When the photochromic material(s) of the eyewear lens product are activated by exposure to UV and/or visible light, the total visible transmittance of the eyewear lens product will decrease, as the lens darkens and/or changes hue. By judicious choice of the photochromic material(s), this can include some reduction in the transmittance in the blue region of the spectrum as a result of the photochromic material(s) and their activation.

In addition, photochromic materials that respond to visible light often exhibit a slight absorbance tail or an absorption band into the blue light region. Thus, even in the rest state, they may provide a slight reduction in transmittance of short wavelength blue light in comparison to other photochromic species. The transmittance will then be further reduced when the photochromic material(s) are activated.

The inventors found that by careful choice of both photochromic materials and selective filters for the invention, a photochromic reduction in blue light transmittance may be combined with the behavior of the selective filtering agent(s) to create an even more beneficial reduction in blue light transmittance to the wearer.

In one preferred embodiment of the eyewear lens product, the photochromic material(s) are positioned such that one or more of the photochromics shields one or more other photochromics from activation. For example, the shielding photochromic material(s) may be positioned in an outer layer or coating of the lens, such that it will be exposed to sunlight before an inner layer or surface comprising the shielded photochromic material(s). Thus, the outer, more exposed photochromic material may absorb more of the light, and contribute more significantly to the optical density and/or coloration of the lens than the shielded materials. In another preferred embodiment, one or more photochromic materials and one or more filtering agent(s) are positioned such that either the filtering agent(s) shield the photochromic material(s) from excessive light, or conversely, the photochromic is activated and tempers the apparent effect of the filtering agent(s).

One preferred embodiment of the eyewear lens product comprises lens material comprising selective filtering agent(s), and a coating of photochromic material(s) on the outer surface of lens. The outer photochromic coating may optionally be over coated with an abrasion-resistant coating and/or an anti-reflection coating. In another preferred embodiment, the eyewear lens comprises a semi-finished lens blank comprising one or more photochromic materials and the selective filtering agent is applied as a coating onto the outer surface of the lens blank.

In another preferred embodiment, the lens product comprises lens material comprising one or more of the selective filtering agent(s) and one or more of the photochromic material(s). In another preferred embodiment, the eyewear lens product comprises a component, such as a semi-finished lens blank, finished lens or finished lens blank that comprises lens material comprising the one or more of the selective filtering agent(s) and one or more of the photochromic material(s). In a further preferred embodiment, this component comprises all the selective filtering agent(s) and all the photochromic material(s) of the eyewear lens product.

In another preferred embodiment, additional lens material that comprises selective filtering agent(s) is cast or molded onto a pre-existing semi-finished lens blank comprising photochromic material(s), such that the selective filtering agent material and the semi-finished lens blank form a composite layered eyewear lens product. In this exemplary preferred embodiment, the basic lens material comprising the selective filtering agent(s) may be the same, similar or disparate from the basic lens material comprising the semi-finished lens blank.

In another preferred embodiment of the eyewear lens product, one or more coatings comprising the photochromic material(s) and/or the selective filtering agent(s) are applied to one or more surfaces of a clear lens product. In one example, the coating comprising selective filtering agent(s) is applied to one lens surface while the coating comprising the photochromic material(s) is applied to the other lens surface. In another exemplary embodiment, first one of the coatings is applied to a surface of the eyewear lens product and then the other coating is applied over at least a portion of the first coating. The first coating may be fully or partially cured before the second coating is applied. The ordering of the coatings will depend on the desired performance of the lens product and the properties of the selective filtering agent(s) and/or photochromic material(s) chosen.

In another preferred embodiment of the eyewear lens product, one or more lens material(s) comprising the photochromic material(s) and/or the selective filtering agent(s) are cast or molding onto one or more surfaces of a clear lens product. In another preferred embodiment, the one or more lens material(s) comprising the photochromic material(s) and/or the selective filtering agent(s) are deposited or sequentially cast with other lens material(s) to form the eyewear lens product. The other lens material(s) may be cured, partially cured or uncured when contacted by the one or more lens materials comprising the photochromic material(s) and/or the selective filtering agent(s).

In one preferred embodiment of the invention, one or more other components of the eyewear lens product comprise thermoplastic polycarbonate. In another preferred embodiment, one or more other components of the lens product comprise a polyurea-urethane material; in another preferred embodiment, the polyurea-urethane material further comprises at least one photochromic material. This lens product further comprises selective filtering agent(s) that may be included in one or more of the thermoplastic polycarbonate, the polyurea-urethane material, or other lens components.

In another preferred embodiment, at least one component of the eyewear lens product comprises thermoplastic polycarbonate, and at least one other component comprises a polyurea-urethane material. In a further preferred embodiment, the at least one other component comprising polyurea-urethane material further comprises at least one photochromic material; in a further preferred embodiment, the polyurea-urethane material comprises at least one photochromic material and at least one UV absorber (and optionally, other additives). In a preferred embodiment, this eyewear lens product further comprises a coating or other component comprising selective filtering agent(s); in a further preferred embodiment, the coating or other component comprising the selective filtering agent(s) comprises a polyurea-urethane material.

In another preferred embodiment, one component of the eyewear lens product comprises a semi-finished lens blank comprising one or more photochromic material(s), wherein the lens material of the semi-finished blank comprises hard resin, polyurea-urethane, or a sulfur-containing polymer with a refractive index higher than about 1.56. In a further preferred embodiment, this one component comprising photochromic material(s) is combined with at least one other component comprising polyurea-urethane lens material that further comprising one or more selective filtering agent(s).

The layers, coatings or other components of the eyewear lens product may each be uniform or non-uniform in thickness. If the eyewear lens product is comprised of multiple layers or components, one or more of these layers or components may be plano, or one or more of the components or layers may contribute optical power to the total lens product due to their thickness and curvatures. Layers and other components may have surface curvatures that are spherical, aspherical, toroidal, asymmetrical, variable, progressive, multifocal, or combinations of any of these. Layers and/or other components may each comprise stepped, discontinuous or offset optical sections on their surfaces.

Layers and other components of the eyewear lens product may be of differing or similar thicknesses. In one preferred embodiment, the combined thickness of the layers and/or other components that comprise the photochromic material(s) and/or selective filtering agent(s) should have sufficient thickness to provide structural integrity to maintain the lens' optical power when in use. In another preferred embodiment, the combined thickness of the layers and/or other components that comprise the photochromic material(s) and/or selective filtering agent(s) should be sufficiently thin that the combination does not craze or delaminate from the eyewear lens product; this can be particularly important if any of the layers or other components are coatings.

Layers, coatings and/or other components that comprise the photochromic material(s) and/or filtering agent(s) may be of uniform thickness, may be contoured to provide optical power, or may conform to shaped features of the lens (e.g., segmented and stepped structures, such as bifocals or trifocal sections), or may create such shaped features on the lens. However, the inventors note that if the thickness is non-uniform, it may affect the optical density and visual color appearance of the lens product due to more or less presence (thickness) of the selective filtering agent(s) or photochromic material(s). Non-uniform thickness can be particularly problematic for layers, coatings or other components containing photochromic materials, because the non-uniform thickness may cause non-uniform coloration or color density; for example, a high-powered minus prescription lens (with thick edges and thin center) comprised of photochromic lens material often creates a colored ring or "raccoon" effect. Therefore, the inventors found that it was preferred to keep these photochromic layers, coatings, or other components relatively thin. For layers or other components that are combined to form a final "finished" lens thickness, preferred individual layer and component thicknesses are between about 2 millimeters and 50 micrometers; in another preferred embodiment, the individual layer or component thicknesses are between about 1 millimeters and 150 micrometers. For coatings, individual thickness ranges are preferably between about 100 micrometers and 1 micrometer, and more preferably between about 50 micrometers and 2 micrometers. For multilayer, interference and graded refractive index filters that comprise selective filters or are included as additional optional components of the eyewear lens product, the total thickness of the combined multiple or graded layer(s) that constitute an individual multilayer, interference or graded refractive index filter is preferably in the range of about 0.1 micrometers to about 100 micrometers, and more preferably about 0.2 micrometers to about 50 micrometers.

Another preferred embodiment to control the uniformity of filtering, optical density and coloring across the eyewear lens product is to ensure that the selective filtering agent(s) or photochromic material(s) are present in sufficiently low concentrations that they are not significantly affected by variations in the coating, layer, or component thickness. For example, for many of the dyes, tints and pigments that may be used as selective filtering agent(s), concentrations in the ppm range are sufficient and practical. In exemplary preferred embodiments, the concentration of dyes or tints is greater than about 0.5 ppm, but preferably less than about 200 ppm, and more preferably less than 50 ppm.

A further preferred embodiment makes use of controlled thickness for components comprising photochromic material(s) and controlled concentrations of the selective filtering agent(s). This approach is also beneficial in optimal material utilization and cost reductions, since often the photochromic materials and selective filtering agents are quite expensive.

EXAMPLES

The invention will now be described in more specific detail with reference to the following non-limiting examples.

Comparative Example 1

For a comparative example, a lens that comprises photochromic material(s) but not the selective filtering agent(s) of the invention was prepared and obtained. To manufacture this lens blank, the polyurea-urethane material as described in U.S. Pat. No. 6,127,505 was further modified as described in U.S. Pat. No. 7,002,744 B2 and processed by techniques described therein to produce a Trilogy® (Younger Mfg. Co.) spherical 6B semi-finished lens blank (76 mm diameter, approximately 8 mm thick). The lens blank was treated with photochromic material(s) by Transitions Optical, Inc. (Pinellas Park, Fla.) to create a Transitions® XTRActive® Trilogy® photochromic grey semi-finished lens blank comprising photochromic material(s), commercially available from Younger Mfg. Co. These lens blanks have a very slight grey tint in the rest condition, and the photochromic material(s) respond slightly to visible light activation, in addition to activation by UV light.

Additional Transitions® XTRActive® Trilogy® photochromic grey semi-finished lens blanks were obtained to act as a lens component providing the photochromic material(s) for inventive Examples 2 and 3. However, for these Examples, each lens blank was mounted in a mold assembly for an additional, sequential casting process analogous to steps 44-48 described in FIG. 5, U.S. Pat. No. 7,002,744 B2. The lens blank was spaced away from a glass, spherical 6B concave molding surface by about 1 mm. The lens blank thus acts as one of the molding surfaces, but becomes part of the final lens product.

Example 2

To create the selective filter for inventive Example 2, approximately 5 ppm of selective absorbing dye ABS456 (commercially available from Exciton, Inc.) was added and thoroughly mixed into the pre-polymer A-side of the liquid polyurea-urethane material as described in U.S. Pat. No. 6,127,505 and further modified as described in U.S. Pat. No. 7,002,744 B2. The liquid-phase, modified A-side and B-side reactants of the polyurea-urethane material were then admitted into the cavity of the sequential casting mold assembly, and the combined lens construction thermally cured to form a new, composite lens blank. In this Example 2, the additional cast layer comprising the added polyurea-urethane lens material and the selective filter was approximately one millimeter thick and positioned on the outer surface of the lens, such that when this lens is exposed to normal lighting, the illumination will be affected by this selective filtering layer before reaching the photochromic materials) of the underlying photochromic lens blank.

Example 3

To create the selective filter for inventive Example 3, approximately 9 ppm of Exciton selective absorbing dye ABS456 was added and thoroughly mixed into the prepolymer A-side of the liquid polyurea-urethane material as described in U.S. Pat. No. 6,127,505 and further modified as described in U.S. Pat. No. 7,002,744 B2. The liquid-phase A-side and B-side reactants of the polyurea-urethane material were admitted into the cavity of the sequential casting mold assembly, and the combined lens construction thermally cured to form a new, composite lens blank. In the same manner as Example 2, the additional cast layer comprising the added lens material and the selective filter for Example 3 was approximately one millimeter thick and positioned on the outer surface of the lens, such that when this lens is exposed to normal lighting, the illumination will be affected by this selective filtering layer before reaching the photochromic material(s).

The lens blank of Comparative Example 1, and the composite lens blanks of Examples 2 and 3 were each surfaced to finished lenses of plano power approximately 2.0-2.2 mm thick. The near UV and visible light transmittance (from 360 nm to 750 nm) was measured for each lens using HunterLab UltraScan XE spectrometer (Hunter Associates Laboratory, Inc., Reston, Va.) and a Shimadzu UV2600 double beam spectrophotometer (Shimadzu Scientific Instruments, Columbia, Md.). Spectra were collected in the rest state by placing each unactivated lens in the instruments. Activated spectra were obtained by irradiating each lens with a UV lamp for 10 minutes immediately before the instrumental spectral measurement. The measurement time for the I-hinter instrument is less than 30 seconds, and less than 2 minutes for the Shimadzu instrument. By employing the same procedure and immediate measurement following activation for each lens, variations due to any fading of the photochromic materials were minimized. Luminous transmittance for each sample was calculated with respect to D65 illuminance and standard human eye response, according to the procedure in ISO 8980-3; 2013, *Ophthalmic Optics—Uncut finished spectacle lenses—Part 3: Transmittance specifications and test methods*.

FIG. 2 shows the spectral transmittance values measured for each of these surfaced lenses in the rest and activated states.

The transmittance through the lens sample of Comparative Example 1 is shown by the spectral traces with dashed lines. The rest state spectral trace is identified, for convenience, with added markers (open triangles) on its dashed line; the spectral trace of transmittance when the photochromic materials of the lens sample have been activated is shown only as a dashed line.

For each of Comparative Example 1, and Examples 2 and 3, UV light is effectively blocked and even high energy blue light is effectively blocked to at least 400 nm in both the rest state and the activated state. This is consistent with the standard performance of the Trilogy lens component used in all these Examples, which is made from polyurea-urethane lens material that contains effective UV-absorbing additives. In the rest state (associated with unactivated photochromic material(s) in the lens product), the transmittance increases quickly to about 84% transmittance in the 450-500 nm region. Note that even in this rest state, Comparative Example 1 blocks some high energy blue light in the 400-430 nm region. This is likely due to the presence of some photochromic materials in the Transition XTRActive Trilogy lens component that are activated by (and absorb) some visible light in this short wavelength region. Consistent with the slight neutral grey tint of this lens, there are no sharp or marked spectral absorbance bands in the rest of the visible region. The measure luminous transmittance of this lens, referenced to a D65 light source and the standard human eye's spectral response, was 82%.

The transmittance of this same lens when its photochromics are strongly activated is shown by the dashed line that measures about 10-15% T from 440-640 nm. The relatively flat spectral response over a large extent of the visible spectral range is consistent with a grey (neutral) color appearance. The transmittance rises in the longer wavelength (red) region of the visible spectrum. The luminous transmittance measured for Comparative Example 1 in the activated state was about 12%.

The spectral transmittance traces measured for Example 2 are shown by solid lines in FIG. 2. For both the rest state (solid line with added "x" markers) and when the photochromic materials are activated in this lens product exemplary of the invention, the same good. UV blocking and demonstrable attenuation at the high energy blue light edge (400-430 nm) is observed as in Comparative Example 1. The selective attenuation between about 445 nm and 470 nm for Example 2 results from the addition of the selective filtering agent in this exemplary lens product (5 ppm ABS456). In the rest state, one observes that the addition of this small amount of selectively absorbing dye results in a maximum transmittance reduction in the selected blue light region of about 8-10%, depending on which adjacent region's transmittance is referenced for the amount of reduction; the maximum reduction occurs near 460 nm. Yet even with this demonstrable and effective selective filtering, the overall visual appearance of this lens is not significantly different from that of Comparative Example 1. Its measured luminous transmittance in the rest state was 80%.

When the photochromic materials in the lens of Example 2 are strongly activated, the total visible transmittance drops significantly (lower solid line trace in FIG. 2), but a small additional reduction in blue light in the selected attenuation region near 460 nm is still discernible and measurable. One can see that the lowest transmittance value in the blue region has been shifted from near about 473 nm for the Comparative Example 1 lens (without the invention's selective filtering) to about 460 nm with the addition of the selective filtering of Example 2. The luminous transmittance of Example 2 in the activated state was about 15%. This transmittance is slightly higher than the Comparative Example 1 lens, but may be due to lens-to-lens normal variation, or more likely, to a slight decrease in activation due the presence of the added layer comprising additional UV-absorbing lens material and the selective attenuating filter.

This illustrates that the combination of the selective filtering agent with the photochromic materials in this exemplary lens product provides demonstrable, enhanced and selective blue light filtering, and that the selective filtering is particularly enhanced in the rest state. This is an important advantage of the lens product of the invention, because it provides additional, selective blue light filtering under normal indoor use, when the wearer is more likely to be exposed to artificial light sources with pronounced high energy blue light features.

The spectral transmittance traces measured for Example 3 are identified by dotted lines in FIG. 2. As in Comparative Example 1 and Example 2, good UV blocking and demonstrable attenuation at the blue light edge (400-430 nm) are measured for the lens of Example 3 in both the rest state (dotted line with added open circles) and when the photochromic material(s) of this exemplary lens have been activated. Particularly in the rest state, increased selective attenuation between about 445 nm and 470 nm was measured for Example 3, resulting from the higher concentration of added selective filtering agent. The addition of a slightly larger amount of selectively absorbing dye for Example 3 as compared to Example 2 (9 ppm vs. 5 ppm) results in a maximum transmittance reduction in this selected region of about 10-15% vs. adjacent spectral regions, with a maximum reduction near 460 nm. This is a larger reduction than was observed for Example 2, but the selective filtering is located in the same spectral region. This illustrates the ability to engineer the intensity of the selective filtering. The overall visual appearance of this lens was not significantly different from that of Comparative Example 1. The measured luminous transmittance of Example 3 in the rest state was 79.5%.

When the photochromic materials in the lens of Example 3 are strongly activated, the total visible transmittance drops significantly (lower dotted line trace in FIG. 2), and the additional reduction in blue light in the selected attenuation region is discernible. The transmittance at 460 nm was reduced a slight but measurably greater amount in this exemplary lens than in the lens of Example 2. Again, the shift to maximum reduced transmittance at 460 nm instead of near 473 nm (as for Comparative Example 1) due to the selective filtering agent is identifiable. The luminous transmittance for Example in this activated state was 15%, similar to Example 2. As with Example 2, this transmittance was slightly higher than the value for the Comparative lens, but may be due to lens-to-lens normal variation, or more likely, to a slight decrease in activation due the presence of the added layer comprising UV-absorbing lens material and the selective filter.

This illustrates that the combination of the selective filtering agent with the photochromic materials in Example 3 also provides demonstrable, enhanced and selective blue light attenuation.

These Examples illustrated the invention as embodied with one exemplary selective filtering agent. Other dyes can be used effectively in the same or other regions of the blue light spectral range. In addition, other selective filtering agents, including thin film multilayer and interference filters can be designed and implemented for use in the invention. Other combination of lens materials, photochromic material(s) and selective filtering agent(s) are within the scope of the invention.

In addition, as shown by these Examples, the selective attenuation can be designed according to the invention to be particularly effective when the photochromic material(s) of the lens are less activated or in a rest state. Then, when the responsive lens of the invention is exposed to bright light that activates one or more of the photochromic material(s), the combined features of the lens product act synergistically to provide good blocking of excessive as well as selectively filtering of potentially damaging blue light.

Although the invention has been disclosed in detail with reference to preferred embodiments, and multiple variations or derivatives of these embodiments, one skilled in the art will appreciate that additional substitutions, combinations, and modifications are possible without departing from the concept and scope of the invention. These and similar variations would become clear to one of ordinary skill in the art after inspection of the specification and the drawing herein.

The invention claimed is:
1. A photochromic eyewear lens product with selective attenuation of the visible spectrum from 380 to 780 nanometers comprising:
   one or more photochromic materials, and
   one or more selective filtering agents that create a region of selective attenuation in a portion of the visible blue light spectral region between 400 nm and 500 nm and two adjacent spectral regions in the visible spectrum with higher transmittance than the region of selective attenuation,
   wherein when the eyewear lens product is in the rest state,
   a1) the eyewear lens product has a luminous transmittance in the range of 60-98% over the visible spectrum and
   a2) the region of selective attenuation has a maximum reduction in transmittance of 5-50% transmittance relative to the higher transmittance in each of the two adjacent spectral regions of the visible spectrum, and
   a3) each of the two adjacent spectral regions contain with local maximum values of greater than or equal to 60% transmittance, and
   wherein when the eyewear lens product is in the activated state,
   b1) the eyewear lens product has a luminous transmittance in the range of 8-40% over the visible spectrum and
   b2) the region of selective attenuation has a maximum reduction in transmittance that is measurably less than the higher transmittance in each of the two adjacent spectral regions of the visible spectrum.

2. The eyewear lens product of claim 1, wherein when the eyewear lens product is in the activated state, the region of selective attenuation has a maximum reduction of less than 10% transmittance relative to the higher transmittance of at least one of the two adjacent spectral regions of the visible spectrum.

3. The eyewear lens product of claim 1, wherein when the eyewear lens product is in the activated state, the region of selective attenuation has a maximum reduction in the range of about 1-5% transmittance relative to the higher transmittance of at least one of the two adjacent spectral regions of the visible spectrum.

4. The eyewear lens product of claim 1, wherein when the eyewear lens product is in the rest state, the region of selective attenuation has a maximum reduction in transmittance relative to the higher transmittance of at least one of the two adjacent spectral regions of the visible spectrum of about 10-25% transmittance.

5. The eyewear lens product of claim 1, wherein at least 98% of light within the 315 nm-400 nm region is blocked.

6. The eyewear lens product of claim 1, further comprising additives selected from the group consisting of photochromics, electrochromics, thermochromics, nanoparticles, liquid crystals, dyes, tints, pigments, UV absorbers, UV reflectors, UV stabilizers, thermal stabilizers, IR reflectors, visible light filters, selective light reflectors, and selective light absorbers.

7. The eyewear lens product of claim 1, wherein the one or more selective filtering agents are selected from the group consisting of dyes, tints, pigments, inorganic interference filters, dichroic filters, multilayer thin film filters, multilayer polymeric interference filters, graded refractive index filter constructs, electrochromics, liquid crystals, electrically activated filters, magnetically activated filters, and combinations thereof.

8. The eyewear lens product of claim 1, wherein the one or more selective filtering agents are comprised in one or more components of the eyewear lens selected from coatings, layers, films, inserts, laminates and sheets.

9. The eyewear lens product of claim 8, wherein at least one of the elements comprises polyurea-urethane lens material.

10. The eyewear lens product of claim 1, further comprising one or more lens materials selected from the group consisting of thermoplastic polycarbonate, hard resin thermoset polymers, polyurea-urethanes, polythiourethanes, episulfides, other sulfur-containing polymers with refractive indices higher than about 1.56, polystyrenes, polyamides, optical-grade nylon polymers, acrylics, polyacrylates and polymethacrylates.

11. The eyewear lens product of claim 1, comprising a composite layered structure.

12. The eyewear lens product of claim 11, wherein at least one layer of the composite layered structure comprises polyurea-urethane lens material.

13. The eyewear lens product of claim 1, wherein the region of selective attenuation is between about 420 nm and 470 nm.

14. The eyewear lens product of claim 1, wherein the region of selective attenuation is between about 440 nm and 480 nm.

15. The eyewear lens product of claim 1, wherein the luminous transmittance of the lens product in the rest state is in the range of 60-90%.

16. The eyewear lens product of claim 1, wherein the luminous transmittance of the lens product in the activated state is in the range of 12-25%.

17. The eyewear lens product of claim 1, further comprising applied coatings selected from the group consisting of hard coatings, hydrophobic coatings, anti-fog coatings, moisture-barrier coatings, mirror coatings, visible light anti-reflective coatings, UV anti-reflective coatings, photochromic coatings, electrochromic coatings, polarizing coatings, polarizing multilayer thin film coatings, multilayer interference coatings, conductive coatings, visible light-filtering coatings, UV light-filtering coatings and infrared light-filtering coatings.

18. The eyewear lens product of claim 1, further comprising one or more components selected from the group consisting of polarizer components, displays, cameras, sensors, transmitters, receivers, electrical devices and wireless devices.

* * * * *